Patented Dec. 25, 1951

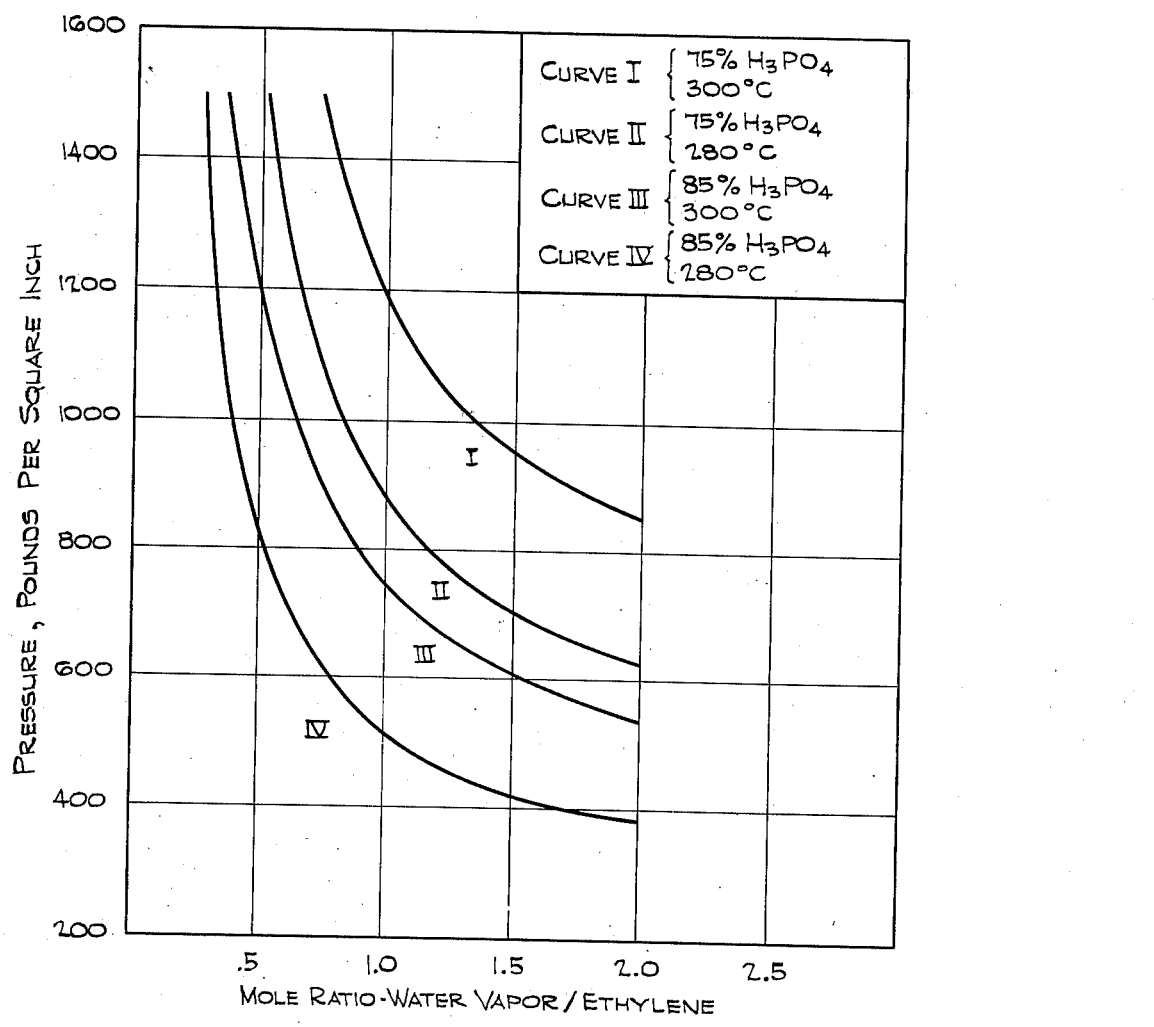

2,579,601

UNITED STATES PATENT OFFICE 2,579,601

OLEFIN HYDRATION PROCESS

Charles R. Nelson, Orinda, Marion A. D. Taylor, Berkeley, Donald D. Davidson, Walnut Creek, and Leslie M. Peters, San Francisco, Calif., assignors to Shell Development Company, San Francisco, Calif., a corporation of Delaware Application August 16, 1950, Serial No. 179,836

13 Claims. (Cl. 260—641)

This invention relates to a process for the hydration of olefins, and finds particular utility as applied to the direct hydration of ethylene to ethanol. This application is a continuation-in-part of our application Serial No. 770,392, filed August 25, 1947, and now abandoned.

While a number of processes for hydrating olefins to the corresponding alcohols are known, the majority thereof have drawbacks of one type or another which seriously impair their utility. Thus, as regards ethylene, for example, the only hydration method heretofore employed on a commercial scale has involved absorption of the ethylene in sulfuric acid, followed by hydrolysis of the resultant ethyl sulfate, a process which is obviously undesirable insofar as it presents serious corrosion problems and involves high processing and reactant costs. Accordingly, it would be desirable if a hydration process for ethylene and other olefins were available which would greatly reduce the corrosion factor and which at the same time would be relatively economical of operation.

It is therefore a general object of the present invention to provide an improved process for hydrating olefins to alcohols. A more particular object is to provide an efficient and economical process whereby ethylene and other olefins may be directly hydrated to alcohols by passing a mixture of the gaseous olefin and water vapor over a phosphoric acid catalyst. A further object is to provide a direct olefin hydration process of this character wherein the corrosion factor is greatly reduced. Still another object is to provide an olefin hydration process of the foregoing type which may be carried out for long periods of time at high efficiency without having to shut down the unit in order to maintain the activity of the catalyst at a high level. The nature of other objects of the invention will become apparent from a consideration of the descriptive portion to follow.

According to the present invention it has been discovered that olefins may be directly hydrated to the corresponding alcohols by continuously passing a gaseous mixture of the olefin and water vapor at elevated temperatures and pressures through a catalyst bed comprising a solid porous support which is incompletely saturated with a solution of phosphoric acid and which is substantially free of any seepage of the acid solution, the activity of the bed being maintained at a high level for long periods of time by the addition of a solution of free phosphoric acid to the bed to make up for the acid lost therefrom as the process continues. While the process is applicable to the hydration of any olefin, it is particularly effective when employed in the hydration of ethylene or other normally gaseous olefins such as propylene or butylene. Accordingly, the invention will be described hereinafter as it relates to the hydration of such gaseous olefins, and more particularly to the hydration of ethylene.

We have found that ethylene may be converted to ethyl alcohol in an efficient and economical manner by continuously passing a heated, gaseous mixture of ethylene and water vapor, in suitable proportions and at an elevated pressure, through a catalyst bed comprising a solid porous support which is incompletely saturated with an aqueous solution of phosphoric acid having a strength of at least 70% and which is free of substantially all seepage of the acid solution. Further amounts of an aqueous solution of free phosphoric acid, referred to herein as "refresher acid," are added to the bed as the process continues to make up for the losses of phosphoric acid from the bed and so maintain the activity of the latter at a high level. Reaction temperatures between 270 and 310° C. are preferably maintained in the bed, and the various conditions of temperature, pressure and ratio of ethylene to water vapor in the feed are so adjusted as to bring the acid in the bed to a concentration of at least 70% both on starting up the process as well as after the addition of refresher acid, and to maintain the acid concentration in the bed at 70% or above during substantially the entire hydration period.

The solid support for the phosphoric acid may be made up of any strong, porous material having good absorptivity for aqueous phosphoric acid solutions, coupled with resistance to attack thereby. While various silicas, aluminas, and cokes or other carbonaceous products can be used, the catalyst support which we prefer to use comprises a calcined diatomaceous earth. This material, while light, has good absorptivity for phosphoric acid solutions and, further, is stable in the sense of being resistant to chemical attack and physical deterioration even with long-continued usage. A particularly useful calcined diatomaceous earth product is that manufactured by the Johns-Manville Corporation and marketed under the trade name "Celite," the grade thereof which preferably is used in the process of this invention being "Celite VIII." The latter material is available in small pellet form and has the composition,

| | Per cent |
|---|---|
| Silica | 86.95 |
| Iron oxide | 2.17 |
| Alumina | 7.51 |
| Magnesia | 1.22 |
| Sodium oxide | 1.21 |
| Calcium oxide | 0.65 |
| Titanium dioxide | 0.19 |
| Remainder | 0.10 |

As already noted above, it is a feature of the present invention that the phosphoric acid-impregnated catalyst bed is maintained in the dry condition (that is, free of any substantial seepage of the phosphoric acid solution) during the hydration operation. Consequently, it is important to bring the unit up to operating conditions in the proper manner and to thereafter add additional quantities of refresher acid, as required, in such a fashion as to permit the catalyst bed to be maintained in the dry condition during substantially the entire olefin hydration period.

The preferred method of initiating the ethylene hydration process, and of placing the apparatus on stream, is to first impregnate the Celite or other solid supporting material with an aqueous phosphoric acid solution having a strength of somewhat less than 70% (e. g., about 55–65%), with the acid being concentrated in situ on the support as the catalyst bed is brought up to reaction temperature and operating conditions are established in the system. In this method of starting up the unit, the solid absorbent is preferably impregnated with the relatively dilute acid solution until the saturation point is reached. The acid may be either hot or cold, and, in either condition, is preferably left in contact with the support for a period of at least one-half hour. The excess solution, if any, is then allowed to drain from the solid absorbent, whereupon the latter, if not already in place in the reactor vessel, is placed therein in the desired position of support. The catalyst bed is then brought up to a temperature which may be somewhat below the operating temperature by passing a heated gas therethrough, as by recycling heated ethylene gas through the system under pressure, either with or without added water vapor, until the temperature in the bed reaches about 175° C. to 200° C. Once such a temperature is attained, water vapor, if not already present in the recycle stream, is gradually admixed with the ethylene, and with continued rise in the recycle stream and bed temperatures, increasingly large proportions of steam are employed until the desired operating pressure and ratio of steam to ethylene required for maintaining an acid concentration of 70% or above are established by the time the bed reaches an operating temperature between 275–310° C. The unit is then ready to go on stream, and the liquid obtained on passing the gaseous effluent from the catalyst bed through a condenser is then sent to the ethanol extraction portions of the system instead of being discarded as waste, as during the start-up period.

Heating the catalyst bed and bringing the unit on stream according to the method described in the preceding paragraph has the effect of concentrating the absorbed acid in situ on the support, with the result that there is obtained a catalyst bed which is incompletely saturated with an aqueous solution of phosphoric acid having a strength of 70% or more, and which manifests the "dry" condition to be observed in the practice of this invention. That is to say, the bed is either entirely free of acid seepage, or experiences extremely small and inconsequential seepage losses not at all like those encountered when the bed is maintained in the fully saturated condition. Furthermore, once the process is in operation, the operating conditions are continuously so regulated as to maintain the relatively high acid concentration and keep the bed in the dry state as the hydration operation continues, information as to representative operating conditions commensurate with this result being presented in the paragraph to follow.

As illustrated by the various curves appearing on the graph in the attached drawing, a given concentration of phosphoric acid may be attained at any given temperature by using any one of many combinations of pressures and water vapor-ethylene molar ratios. Curve I indicates the respective pressures and molar ratios to be employed if the phosphoric acid in the catalyst bed is to be maintained at a concentration of 75% and at a temperature of 300° C., water vapor-ethylene molar ratios of 0.75, 1.0 and 1.5, for example, being used with total system pressures of 1500, and 1180 and 950 pounds per square inch, respectively. Curve II also represents a system wherein the phosphoric acid is maintained at 75% but here the reaction, or bed temperature, is reduced to 280° C., and under these conditions use of water vapor-ethylene molar ratios of 0.65, 1.0 and 1.5, for example, requires the establishment of total system pressures of 1200, 875 and 700 pounds per square inch, respectively. In the system illustrated by curve III the conditions are such that the phosphoric acid attains a concentration of 85% at a reaction temperature of 300° C., and by inspecting that curve appropriate pressure and water vapor-ethylene molar ratios may be determined. In curve IV the reaction temperature is reduced to 280° C. while maintaining the concentration of phosphoric acid at 85%, and again inspection of the curve will indicate proper operating conditions. The exact shape which the curve must assume for any given acid concentration and operating temperature may be calculated from known equilibrium data, though it is believed that inspection of the graph shown in the drawing will suggest appropriate operating conditions to be observed when acid concentrations between 75% and 85%, and reaction temperatures between 280° C. and 300° C., are to be established.

While the start-up method described above (involving impregnating the catalyst support with relatively dilute phosphoric acid and concentrating the latter in situ on the support as the catalyst bed is brought up to operating temperatures) comprises the preferred method for initiating the olefin hydration process of the present invention, it is also possible to initially impregnate the bed with phosphoric acid having a concentration of 70% or more. This method has the disadvantage of entailing considerable weeping of acid from the bed as the latter is brought up to operating conditions unless extreme care is taken in the proportioning of the aqueous and non-aqueous components of the recycle mixture employed to heat the bed. Further, in these cases where the bed has been inititially saturated with the concentrated acid, weeping of acid from the bed is apt to occur for some little period after the unit has been placed on stream, though eventually the acid will be depleted to such an extent that the bed will assume the dry condition desired, and the process will then go on in the proper manner. Such losses of phosphoric acid from the catalyst bed during either the start-up or initial operating periods are undesirable since they not only present a corrosion problem, but others as well. Thus, since the weeping acid carries out fines as well as soluble matter from the catalyst support, considerable fouling and plugging is apt to occur in subsequently encountered portions of the apparatus with which the acid comes into contact.

Once the ethylene or other olefin hydration process is under way, it has been found that the activity of the catalyst bed is gradually reduced. This decrease in the efficiency of the bed is evidently attributable to losses of phosphoric acid therefrom in a manner not as yet fully understood since there is substantially no physical entrainment of phosphoric acid by the reactant gases passing through the catalyst bed. It therefore forms an important feature of the present invention that the activity of the catalyst bed can be maintained at a relatively high and constant level without interruption of the hydration operation by adding further quantities of phosphoric acid to the bed to make up for the amount of acid lost therefrom as the process is continued. By adding refresher acid in this manner, it has been found that given units may be kept in continuous operation at high efficiency levels for periods of many months' duration, whereas without the addition of new acid the efficiency of the process would fall off to such an extent that the process would be impractical of operation after, at most, a few weeks. The amount of refresher acid to be added is, in general, related to the quantity of alcohol produced. Thus, in the case where ethylene is the olefinic reactant, the activity of the catalyst bed may be maintained at a high level by adding approximately 1 pound of phosphoric acid (calculated as 100% $H_3PO_4$) for every 150–250 pounds of ethanol produced. The addition of even smaller amounts of acid than this, e. g., of 1 pound of acid for every 400 pounds of ethanol, also exerts a beneficial effect on the activity of the bed, though under these circumstances there will usually be experienced an overall downward drift in bed activity. Again, larger proportionate amounts of acid may also be employed in some plants, without harmful results. Thus, in some cases it has been found possible to add as much as one pound of $H_3PO_4$ per 100 pounds of ethanol produced, though here it was evident that flooding of the bed was occurring in some instances, with the resultant disadvantages of corrosion and fouling as noted above.

The refresher acid may be added to the catalyst bed in either a continuous or an intermittent manner, though excellent results have been obtained by making periodic additions of the acid whenever the efficiency of the unit drops off from about 5 to 20%. In either case, the amount of acid added, and the rate of its addition, should preferably be so controlled as to prevent substantially all seepage of acid therefrom. In the case of intermittent addition of refresher acid it is possible to operate the process by adding acid to the bed until some seepage of acid from the bed actually occurs before acid addition is terminated, for with continued operation the bed is quickly restored to the dry condition; this is particularly the case when the refresher acid is relatively dilute (e. g., 65%). However, the preferred method of adding the refresher acid, even when the latter is supplied to the bed in an intermittent manner, is to so control the amount and rate of its addition as to prevent seepage of acid from the bed. In the case of either continuous or intermittent addition of the refresher acid, the latter may simply be allowed to drip into the catalyst bed, or it may be applied thereto in the form of a light spray. At the elevated temperatures prevailing in the system, any acid added is rapidly brought to the concentration of the acid already present. Accordingly, the concentration of acid added to the bed as the process continues is not significant, and as long as the amount added (expressed as 100% $H_3PO_4$) does not exceed that lost, there will be no seepage of acid from the bed.

When the olefinic reactant is ethylene, the temperature of the catalyst bed should be maintained within the range of about 270 to 310° C. and preferably within the range of 290–300° C., any given temperature being taken as the average of the various temperatures prevailing near the top center and bottom portions of the bed. As the bed temperatures rise above the level here recommended, and particularly above 325° C., the overall efficiency of the operation is greatly impaired; not only is there a fall in the percentage of ethylene converted into ethyl alcohol per pass through the catalyst, but also much of the ethylene is either converted into the polymer form or contributes to the formation of other products of an undesirable nature which, along with the polymer, are difficult to separate from the alcohol. Similarly, at lower temperatures than those here recommended, and particularly when the bed temperature begins to fall below 265° C., the proportion of ethylene converted to alcohol again falls off to such an extent that the process becomes impractical of operation.

The pressure to be maintained in the system when hydrating ethylene, and the water vapor-ethylene mole ratios to be observed for selected temperatures, acid concentrations and pressures, may be determined by resort to the graph presented in the attached drawing, or the same may be calculated from available equilibrium data.

When olefins other than ethylene are being hydrated, the reaction temperatures (and pressures) are preferably somewhat lower than for ethylene. Thus, in the case of propylene good results are obtained by operating at about 200–250° C., while somewhat lower temperatures still are preferably employed with the higher olefins.

The ethylene employed as feed stock in the process of this invention may be derived from any convenient source, as by the catalytic cracking or thremal cracking of petroleum hydrocarbons. By whatever manner obtained, the ethylene is normally submitted to a scrubbing or other appropriate treatment to remove any other gases which maye be present. When manufacturing ethylene on a commercial scale, however, it is difficult to remove all traces of such other gases as may be present, and as a result some are still present in the ethylene feed stock. While most of these gaseous impurities do not interfere with the hydration process, acetylene, which frequently is present in the ethylene in amounts of 1% or more, does not fall into this category. We have found that if either the ethylene or the water vapor admixed therewith, or even the feed water from which said vapor is produced, comes into contact with copper surfaces at one or more points before the gases are passed through the catalyst bed, the acetylene present is converted to cuprene, a solid material which rapidly fouls the bed and so renders the process inoperable. Accordingly, if any acetylene is present it is essential to a practice of this invention that the raw materials employed be copper-free (i. e. contain less than 0.1 part per million of copper), and that said reactants be conducted to the catalyst bed out of contact with any copper surfaces. When no copper is present in the inlet gaseous stream, the acetylene is readily converted to acetaldehyde as the gases pass through the catalyst bed, and no precautions need be taken when handling the effluent stream as regards cuprene formation. The term "copper," as employed herein, refers not only to pure copper, but also to those metals containing substantial amounts of copper, as 10% or more.

The following examples illustrate the manner in which the invention described herein may be practiced:

Example I

Approximately 2.5 cubic feet (90 pounds) of Celite VIII pellets, each having a generally cylindrical shape and measuring $\frac{3}{32} \times \frac{3}{16}$ inches, were placed in a copper-lined, steel reactor vessel where they were flooded with a cold aqueous solution of phosphoric acid (65%) for 2 hours. The acid was then drained from the pellets and they were allowed to stand for a further period of 2 hours. The bed was then found to contain 77 pounds of the acid solution, or 50 pounds of the acid expressed as 100% $H_3PO_4$. Ethylene was then charged into the system and the latter was brought up to a pressure of 865 pounds per square inch. The ethylene was then recycled through the system, at gradually increasing temperatures, at the rate of about 50 cubic feet per minute (standard conditions) until the catalyst bed reached a temperature of 175° C. to 200° C., a period of about 1 hour being used to effect this phase of the drying operation. Small amounts of steam were then admixed with the ethylene recycle stream, and with gradually increasing temperatures, the proportion of water to ethylene was increased until the bed temperature reached approximately 280° C., at which point the desired operating water vapor-ethylene molar ratio of 0.6 has been established in the inlet stream. The rate of passage of combined gases over the catalyst was then raised to 75 cubic feet per minute and the temperature of the catalyst bed was gradually increased until it reached the operating temperature of 290° C., this second phase of the heating cycle having taken another period of about an hour. At this point the acid on the bed had a strength of about 85%. It should be noted that during the foregoing heating operation, the gases coming out of the catalyst bed were passed through a condenser to effect separation of the ethylene and other normally gaseous materials from the water and other liquids formed during the condensation step. The gas phase was then recycled to the reactor after being heated and mixed with any desired quantities of steam. Once the system was in operation at 290° C., analysis of the liquid obtained by condensing the effluent gases disclosed that 4.5% of the ethylene in the feed was being converted to ethanol per pass through the catalyst bed. At this point in the operation, the unit was regarded as being on stream, and the liquid phase obtained in the condenser was sent to product recovery instead of being discarded as waste as during the start-up period. The process was then continued without interruption for a period of 300 hours. On then testing the condensate it was found that the percentage of ethylene converted to ethanol per pass through the bed had been reduced to 3.9%. At this stage in the operation (the process being meanwhile continued without interruption), phosphoric acid was sprayed onto the catalyst bed at a rate equivalent to 8 pounds of 100% acid per day, though the acid added was actually in the form of a 65% aqueous solution. At the end of the third day, when approximately 24 pounds of acid had been added (or an average of 1 pound for each 200 pounds of alcohol theretofore produced), it was found that the activity of the catalyst bed had been substantially restored to the lever prevailing at the beginning of the run. Spraying of acid into the bed at the relatively slow rate mentioned above did not cause any weeping of acid from the bed, the latter seeming to retain its dry appearance, with all the refresher acid added being rapidly brought to a concentration of about 85%. Examination of the catalyst material on the completion of the run disclosed it to be in perfect condition, and there was no reason why the operation might not have been continued indefinitely at a high level of efficiency, with either periodic or continuous additions of the acid being made. The walls of the reactor vessel lying adjacent the catalyst bed exhibited little evidence of corrosion.

Example II

Approximately 0.5 cubic foot of Celite VIII pellets was immersed for 2 hours in a 63% aqueous solution of phosphoric acid maintained at 37° C. Upon being removed from the solution and allowed to drain, the impregnated pellets were placed in a copper-lined, steel reactor vessel, where they were dried and the phosphoric acid concentrated to a strength of 80% to 85% by first recycling heated ethylene, and thereafter ethylene and water vapor, through the bed in the manner described in Example I. This catalyst was kept in continuous operation for 3454 hours, operating with a total system pressure of 915 pounds per square inch, a bed temperature between 294° C. and 300° C., a water vapor-ethylene molar ratio of from 0.56 to 0.64, and with from 15 to 20 cubic feet of reactant gases being passed through the catalyst bed per minute. During the first 2514 hours of this run, occasional additions of dilute phosphoric acid were made, the amount added in no case being sufficient to cause seepage of acid from the catalyst bed, but no attempt was made to maintain the conversion at peak efficiency. At the end of said 2514-hour period, and when the bed contained an undetermined amount of phosphoric acid of 80% to 85% strength, approximately 3.2% of the ethylene in the bed was being converted to ethanol per pass through the catalyst bed. The addition of 2.15 pounds of acid (100% $H_3PO_4$), sprayed onto the bed in the form of a 39.7% aqueous solution at the rate of about 45 milliliters per hour, raised the ethylene conversion to 4.4%. During the succeeding portion of the run, six further additions of the acid were made, or one about every 130 hours, the conversion of ethylene dropping off between additions to from 4% to 4.2%, and being restored to approximately the 4.4% level with each new influx of acid, the average amount of acid (100% $H_3PO_4$) employed in each addition period being 0.75 pound, and the addition in each case being made in substantially the form and manner described above. During the last 940 hours of the run, in which time all seven of the acid additions here described were made, an average of 384 pounds of alcohol were produced for each pound of acid added. When the equipment employed in this example was disassembled after being in operation for 3454 hours, the reactor vessel exhibited little evidence of corrosion, and it appeared that there had been no seepage of acid from the bed at any time during the run. Further, the pellets comprising the support in the catalyst bed were in excellent condition. It seemed evident that the process could have been continued more or less indefinitely, and at a high level of efficiency.

*Example III*

This operation was directed to the production of isopropanol. The catalyst employed was prepared by immersing Celite VIII pellets for approximately 2 hours in a boiling, aqueous solution of $H_3PO_4$ (60%), and thereafter draining the pellets and drying them in a stream of air at 120° C. for 18 hours. The resulting pellets, which contained 43.1% by weight of acid (calculated as 100% $H_3PO_4$) and presented a dry appearance, were then placed in a reactor tube. The gaseous feed mixture, made up of propylene and water vapor ($H_2O/C_3H_6$ mol ratio=0.62), was then passed through the reactor tube for 33.6 hours (approximately 6.7 hrs. per day) at temperatures of from about 225 to 250° C., a pressure of 550 p. s. i. g. and a vapor space velocity per minute of about 40 (calculated at 60° F. and 1 atmosphere). The gaseous effluent from the reactor tube was passed through a condenser, and the resulting condensate was found to contain an average of 21.1% isopropanol, with the average conversion of feed propylene to isopropanol per pass through the reaction tube being 3.8%. At the end of this run the activity of the catalyst was found to be substantially undiminished, though, as the process is continued still further, the activity of the catalyst is gradually impaired. However, the activity of the catalyst can be restored to its original (fresh) level whenever desired by providing the pellets with fresh quantities of phosphoric acid in the amount of 1 pound of the acid (calculated as 100% $H_3PO_4$) for every 200 pounds of isopropanol produced.

*Example IV*

This operation illustrates the manner in which the present invention is employed in the production of ethanol on a plant scale. Here the catalyst support in a given unit is made up of 39,000 pounds of the Celite VIII pellets described in Example I, these pellets forming a bed 7 feet in diameter and 27 feet thick when placed in a cylindrical, copper-lined, steel reactor vessel. This Celite bed is impregnated with phosphoric acid by thrice repeating the following sequence of steps: (1) flood the bed with an aqueous solution of $H_3PO_4$ (65%), (2) allow the bed to soak in the acid solution at room temperatures for 3 hours; and (3) drain the acid from the bed and pump it out of the reactor vessel. The acid on the pellets is then concentrated to the desired operating strength of about 80–82% as the catalyst bed is brought up to operating temperature and the unit is placed on stream. This acid-concentrating and heating step is accomplished by pressuring the system with ethylene (500 p. s. i.) and then recycling the ethylene through the catalyst bed at an initial vapor space velocity per minute (VSVM) of approximately 15 and at gradually increasing temperatures, the ethylene being passed through a condenser and a water scrubber after leaving the catalyst bed before being again heated and circulated through the catalyst-filled reaction chamber. In the earlier phases of the warm-up operation, no additional water vapor other than that provided by the water scrubber need be added to the recycle gases. The water in the scrubber is a 50° C. at the start of the heating cycle and builds up to about 65° C. as the recycle gases from the catalyst bed become hotter; however, to avoid operating difficulties, the temperature in the scrubber is thereafter maintained at 65° C. As the temperature in the catalyst bed (by which is meant the average or median temperature prevailing in the bed) rises above 65° C. and begins to approach 90–100° C., additional quantities of water or water vapor are admixed with the recycle gases in an amount sufficient to provide a water partial pressure of approximately 6 p. s. i. in the system. The amounts of water vapor added to the recycle stream are then gradually increased as the bed temperature rises still further until, with the attainment of operating temperatures (290° C.), the mole ratio of water to ethylene in the gases fed to the catalyst bed is approximately 0.6. Thus, as the bed temperatures of 110, 140, 150, 190, 220 and 260° C. are achieved, the partial pressure of water established in the system is approximately 8.5, 17.5, 23.5, 57, 100, and 245 p. s. i., respectively. By adding the water in increasingly large amounts to the recycle stream in this manner, the phosphoric acid on the catalyst bed is gradually concentrated from its initial strength of 65% (which strength is maintained until the bed temperature reaches approximately 75–80° C. under the conditions described herein) to a strength of approximately 80–82% as operating conditions are established in the system. In bringing the bed up to operating temperatures in the manner here described, care is taken to increase the temperature of the recycle gases at such a rate that the spread in temperatures between the upper (inlet) and lower (outlet) portions of the bed does not exceed about 30° C. This requires a heating period of approximately 20–25 hrs. for the aforementioned catalyst bed. With the attainment of operating temperatures, the system is placed on stream by connecting the recycle feed line with a source of ethylene under a pressure of 1,000 p. s. i. and by diverting the liquid formed in the condenser to the ethanol recovery portions of the plant instead of discarding the condensate as waste. The unit is thereafter maintained in continuous operation, utilizing a VSVM rate of 30 as well as a water/ethylene mole ratio in the feed gas of approximately 0.6. It may be noted that the non-aqueous component of the gaseous feed stream supplied the catalyst bed contains approximately 85% ethylene. Under these conditions, approximately 4.2% of the ethylene in the feed is converted to ethanol per pass through the catalyst bed. This conversion rate falls off by approximately 10% as the process is continued for 100 hours, during which period there is produced approximately 430,000 pounds of ethanol. During the next 100 hours of operation (in which a further quantity of 430,000 pounds of ethanol is produced) the refresher acid (65% aqueous $H_3PO_4$) is continuously sprayed onto the bed, some 5,700 pounds of phosphoric acid (calculated as 100% H₃PO₄) being added during this period. This is equivalent to approximately 1 pound of H₃PO₄ for each 150 pounds of ethanol produced during the 200 hour period of operation. The addition of refresher acid in the foregoing manner has the effect of restoring the activity of the catalyst bed to its original level, while at the same time being insufficient to cause any appreciable weeping of acid from the bed. The process is then continued employing the same pattern of approximately 100 hours of operation without addition of refresher acid followed by a like period during which acid is sprayed onto the bed.

*Example V*

The process of the foregoing example is repeated except that here the catalyst bed is brought up to operating temperature in the following manner: Heated ethylene gas, which is free of any water vapor other than that provided by the scrubber, is passed through the catalyst bed until the latter reaches a temperature of approximately 190° C., the time required for this portion of the heating step being about 15 hours. As the catalyst bed is then heated above 190° C., water vapor is added to the ethylene recycle stream, and in increasingly large amounts, until, with the attainment of a bed temperature of about 290° C. (requiring a further heating period of about 1½ hours) the desired H₂O/C₂H₄ feed ratio of 0.6 is established.

The invention claimed is:

1. In a process for the continuous production of ethyl alcohol, the steps comprising preparing a catalyst bed by impregnating a solid, porous supporting material with phosphoric acid of strength less than 70% and drying said support to concentrate the acid absorbed thereby to a strength between 75% and 85%, continuously passing a gaseous mixture of ethylene and water vapor through the catalyst bed at a temperature sufficient to maintain the bed at a temperature between 290° C. and 300° C. while simultaneously so controlling the pressure of said mixture and the water vapor to ethylene molar ratio therein as to maintain the strength of the absorbed acid between 75% and 85%; and adding further amounts of phosphoric acid to said bed as the process continues, said last named acid being added as an aqueous solution of free phosphoric acid in the amount of about one pound of acid (calculated as 100% H₃PO₄) for each 100 to 400 pounds of alcohol produced during the process, and at a rate so controlled as to prevent substantially all seepage of acid from the bed.

2. In a process for the continuous production of ethyl alcohol, the steps comprising preparing a catalyst bed by impregnating a solid, porous supporting material with phosphoric acid of strength less than 70% and drying said support to concentrate the acid absorbed thereby to a strength of at least 75%; continuously passing a gaseous mixture of ethylene and water vapor through the catalyst bed at a temperature sufficient to maintain the bed at a temperature between 270° C. and 310° C., while so controlling the pressure of said mixture and the relative proportions of its ethylene and water vapor components as to maintain the acid at a strength of at least 75%; and adding a solution of free phosphoric acid to the bed as the process continues, but only in a quantity sufficient to replace acid lost as a result of the passage of said mixture through the bed, the rate of addition of said further amounts of phosphoric acid being so controlled as to prevent substantially all seepage of acid from the bed.

3. The process of claim 2 wherein said solid, porous supporting material is made up of small pellets of calcined diatomaceous earth.

4. In a process for producing ethyl alcohol by the hydration of ethylene, the steps comprising absorbing phosphoric acid of less than 70% strength on a solid, porous support; drying said support to increase the concentration of the absorbed acid thereon to at least 75%; continuously bringing a mixture of ethylene and water vapor into intimate contact with said support and the concentrated acid absorbed thereon at a temperature between 270° C. and 310° C. and under such conditions of elevated pressure and proportions of water vapor to ethylene as to maintain the concentration of said acid above 75% and continuously adding an aqueous solution of free phosphoric acid to the support in an amount equivalent to about one pound of 100% H₃PO₄ for each 100 to 400 pounds of alcohol produced at a rate controlled so as to prevent seepage of acid solution from the support.

5. The process of claim 4 wherein said solid, porous support is made up of small pellets of calcined diatomaceous earth.

6. In a process for producing ethyl alcohol by the hydration of ethylene, the steps comprising continuously passing a gaseous mixture of ethylene and water vapor, at elevated temperature and pressure, into intimate contact with a catalyst bed made up of a solid, porous support containing absorbed phosphoric acid of strength greater than 70%, said acid having been supplied to said support in a more dilute form and thereafter having been concentrated in situ on said support; maintaining the activity of the catalyst bed at a high level as the process is continued by the addition of quantities of phosphoric acid in the form of an aqueous solution of the free acid to said support, said acid being added only in an amount sufficient to replace acid lost on passing said mixture into contact with said catalyst and a rate so controlled as to prevent substantially all seepage of acid from the support; and so controlling the temperature, pressure and proportion of ethylene to water vapor in said mixture as to maintain the concentration of acid absorbed on said catalyst, including that added during continuation of the process, above 70%.

7. The process of claim 6 wherein the acid added during continuation of the process is provided in the amount of 1 pound (calculated as 100% H₃PO₄) for every 100 to 400 pounds of alcohol produced.

8. In a process for producing ethyl alcohol whereby a gaseous mixture of ethylene and water vapor, at elevated temperature and pressure, is continuously passed through a catalyst bed comprising phosphoric acid absorbed within a solid, porous support, which bed is free of any seepage of phosphoric acid, the step comprising adding a solution of free phosphoric acid to the support to make up for the amount of said acid lost therefrom as a result of passing said gaseous mixture through the catalyst bed, the amount of said make-up acid added to the support and the rate of its addition thereto being so controlled as to prevent substantially all seepage of acid from the support.

9. The process of claim 8 wherein the amount of make-up phosphoric acid added to the support is approximately one pound (calculated as 100% $H_3PO_4$) for each 100 to 400 pounds of alcohol produced.

10. In a process for producing alcohols by the direct hydration of olefins, the steps comprising absorbing a solution of phosphoric acid of less than 70% strength on a solid, porous support; drying the acid-containing support to increase the concentration of absorbed acid to at least 75%; continuously bringing a gaseous feed mixture of olefin and water into intimate contact with said concentrated acid-containing support at such elevated conditions of temperature and pressure, for the ratio of water to olefin employed in the feed mixture, as to maintain the phosphoric acid on the support at a concentration of at least 75%; and adding a solution of free phosphoric acid to the support, as the hydration operation continues, to make up for the amount of phosphoric acid which is lost from the support as a result of passing the gaseous feed mixture therethrough, the amount of phosphoric acid added in this fashion not exceeding one pound (calculated as 100% $H_3PO_4$) for each 100 pounds of alcohol produced.

11. In a process for producing alcohols by the direct hydration of olefins whereby a gaseous mixture of olefin and water vapor, at elevated temperature and pressure, is continuously passed through a catalyst bed comprising phosphoric acid absorbed within a solid porous support, which bed is free of substantially all seepage of phosphoric acid, the step comprising adding a solution of free phosphoric acid to the support, as the hydration operation continues, to make up for the amount of phosphoric acid which is lost from the support as a result of passing the gaseous feed mixture therethrough, the amount of phosphoric acid added in this fashion not exceeding one pound (calculated as 100% $H_3PO_4$) for each 100 pounds of alcohol produced.

12. The process of claim 11 wherein the olefinic component of the feed mixture is ethylene and the alcohol produced is ethanol.

13. The process of claim 11 wherein the olefinic component of the feed mixture is propylene and the alcohol produced is isopropanol.

CHARLES R. NELSON.
MARION A. D. TAYLOR.
DONALD D. DAVIDSON.
LESLIE M. PETERS.

No references cited.